US009514573B2

(12) United States Patent
Grimaud (10) Patent No.: US 9,514,573 B2
(45) Date of Patent: Dec. 6, 2016

(54) DIMINISHED REALITY

(71) Applicant: Dassault Systemes, Velizy Villacoublay (FR)

(72) Inventor: Jean-Jacques Grimaud, Winchester, MA (US)

(73) Assignee: Dassault Systemes, Velizy Villacoublay (FR)

( * ) Notice: Subject to any disclaimer, the term of this patent is extended or adjusted under 35 U.S.C. 154(b) by 246 days.

(21) Appl. No.: 14/141,243

(22) Filed: Dec. 26, 2013

(65) Prior Publication Data

US 2015/0187136 A1 Jul. 2, 2015

(51) Int. Cl.
*G06T 15/00* (2011.01)
*G06T 19/00* (2011.01)
*G06T 17/00* (2006.01)
*G06T 7/00* (2006.01)

(52) U.S. Cl.
CPC ........... *G06T 19/006* (2013.01); *G06T 7/0067* (2013.01); *G06T 17/00* (2013.01); *G06T 2210/04* (2013.01)

(58) Field of Classification Search
CPC ... G06T 19/006; G06T 17/00; G06T 7/0067; G06T 2210/04
USPC ................................ 345/419, 420, 631, 632
See application file for complete search history.

(56) References Cited

U.S. PATENT DOCUMENTS

| | | | | |
|---|---|---|---|---|
| 7,301,547 B2 * | 11/2007 | Martins | .................... | G06T 19/00 345/419 |
| 7,474,318 B2 * | 1/2009 | Zhou | .................... | G06F 3/04815 345/419 |
| 8,140,989 B2 * | 3/2012 | Cohen | .................... | G06Q 50/22 703/1 |
| 8,537,075 B2 * | 9/2013 | Crocco | .................... | G09G 5/00 345/7 |
| 8,547,401 B2 * | 10/2013 | Mallinson | ............... | A63F 13/02 345/632 |
| 8,705,893 B1 * | 4/2014 | Zhang | ................ | G06K 9/00201 345/418 |
| 8,868,375 B1 * | 10/2014 | Christian | ............. | G01C 21/206 33/228 |
| 8,988,464 B2 * | 3/2015 | Kim | ...................... | G06T 19/006 345/633 |
| 9,147,291 B2 * | 9/2015 | Xu | ......................... | G06T 19/006 |
| 9,274,595 B2 * | 3/2016 | Reitan | ...................... | G06F 3/011 |
| 2012/0183204 A1 | 7/2012 | Aarts et al. | | |

OTHER PUBLICATIONS

Hutchings, Ideas for Innovation, App Replaces Need to Take Room Measurements, Creates Automatic Floor Plans From Photos.*
MagicPlan of Sensopia—Capture the Floor Plan of your House with MagicPlan, http://sensopia.com/english/product.html, 3 pages, printed on Dec. 26, 2013.
Floored, Posted by Dave on Dec. 19, 2013, http://floored.com/blog/2013/series-a financing-round.html, 3 pages, printed Dec. 26, 2013.

(Continued)

*Primary Examiner* — Phu K Nguyen
(74) *Attorney, Agent, or Firm* — Hamilton, Brook, Smith & Reynolds, P.C.

(57) ABSTRACT

A computer tool generates user-defined diminished reality images of a subject environment from source images. The diminished reality images display less real-world objects in the subject environment than that displayed in the source images. A 3D model of the subject environment in diminished reality is formed from the diminished reality images. The 3D model supports augmented reality user interaction with views of the subject environment diminished in reality and tidied/decluttered of user-selected objects.

17 Claims, 6 Drawing Sheets
(2 of 6 Drawing Sheet(s) Filed in Color)

(56) References Cited

OTHER PUBLICATIONS

European Search Report for EP Application No. 14 19 8393 dated Dec. 2, 2015 entitled "Diminished Reality".
Siltanen, S., "Theory and applications of marker-based augmented reality", Jun. 1, 2012.
Yamada, R., et al., "Development of an augmented reality based 3D catalog for electronic commerce", IECON-2002, Proceedings of the 28th Annual Conference of the IEEE Industrial Electronics Society, Nov. 5-8, 2002.
Kawai, N., "Diminished Reality Based on Image InpaintingConsidering Background Geometry", Journal of L A Tex Class Files, vol. 6, No. 1, Jan. 2007.

* cited by examiner

DIMINISHED REALITY

BACKGROUND OF THE INVENTION

With the advent of augmented reality, various combinations of reality images and virtual image elements may be had. However, one of the challenges limiting the applicability of augmented reality is the reality itself. In reality images of rooms in a house to be remodeled, there is already a sofa where one would like to put the new virtual one. There are existing cabinets in the images where one needs to virtualize new cabinets. There are displayed objects where one wants to visualize a different configuration and so forth. In reality images of a store floor, there are products on the shelves where one would like to place other products or where one would like to rearrange the current products. Reality is already "everywhere" when one wants to use augmented reality to bring the subject to a newly designed virtual state.

Thus, there is a need to tidy reality images by removing different reality objects captured in the image that are no longer wanted. There is a related need to be able to perceive accurate measurements of the space to be remodeled, so that the fit of configurations of virtual objects, such as kitchen cabinets, for example, can be properly analyzed.

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product. These CAD systems allow a user to construct and manipulate complex three dimensional or 3D models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects; the typical size of a file representing an object in a CAD system being in the range of one Megabyte per part, and an assembly may comprise thousands of parts. A CAD system manages models of objects, which are stored in electronic files.

In computer-aided techniques, the graphical user interface GUI plays an important role as regards the efficiency of the technique. Most of the operations required for manipulating and/or navigating the modeled objects may be performed by the user (e.g. the designer) through the GUI. Especially, the user may create, modify, and delete the modeled objects forming the product, and also explore the product so as to comprehend how modeled objects are interrelated, e.g. via a product structure. Traditionally, these operations are carried out through dedicated menus and icons which are located on the sides of the GUI. Recently, CAD systems allow calling these operations nearby the representation of the product. The designer does not need any more to move the mouse towards menus and icons. Operations are thus available within reach of the mouse. In addition, the operations behave semantically: for a given operation selected by the designer, the CAD system may suggest to the designer, still nearby the mouse, a set of new operations according to the former selected operation that the designer is likely to select.

SUMMARY OF THE INVENTION

Various environments may be the subject of interest in embodiments of the present invention. For clarity of description, example environments are presented in the figures and below discussions. These examples are for purposes of illustration and not limitation of the principles of the present invention. Subject environments may be, for non-limiting example, a room in a house or office, certain aisles or other portion of a retail store, and other user configurable areas.

A subject environment has different stages or states. In the room example, a bare stage means that the room is empty of furniture and furnishings, generally "objects." At an opposite stage, a full stage, the room has a number of objects. At intermediate stages, the room has intermediate numbers of objects, i.e., one or more pieces of furniture and furnishings but not more than at the full stage. Likewise in the example of a store aisle, at a bare stage, the shelves of the store aisle are empty of product/inventory (holding no objects). Or there may be no shelves/shelving units. At intermediate stages, the shelves have some amount of product (intermediate numbers of objects). At a full stage, the shelves have about their highest number of objects. And so forth.

Generally, the objects are able to be changed in physical placement (arrangement/organization) and orientation in the environment. The objects are able to be updated in color and/or material finish (or texture). The objects are able to be swapped or replaced with alternative objects having different styles and/or configuration (shape, size and other physical characteristics).

Images of the subject environment at an intermediate or full stage capture the various objects and depict current reality. A person looking at the images may be able to imagine some of the displayed objects updated in color or finish (texture) in the subject environment. An augmented reality view may be able to assist with changing such appearances of the displayed objects. However, a person looking at the images, with or without augmented reality, is typically unable to imagine some of the displayed objects rearranged in the subject environment or removed from or replaced by alternatives in the subject environment.

Embodiments of the present invention address the foregoing concerns and operate as follows.

In an example embodiment, a reality staging engine sets an image view of the current environment to a user-desired stage, for example, to a partially or completely empty room of a house or empty shelf in the store in the examples above. The resulting view (of the subject environment at the desired/selected stage) is referred to as "dimensional reality." A 3D modeling engine or modeler generates a working 3D model of the diminished reality version of the subject environment.

An augmented reality subsystem superimposes various display elements (virtual elements) on the 3D model diminished reality view. The display elements represent the user-added, swapped or changed (rearranged, reoriented or otherwise reconfigured) real world objects that pose the subject environment in a newly depicted augmented reality view for the user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
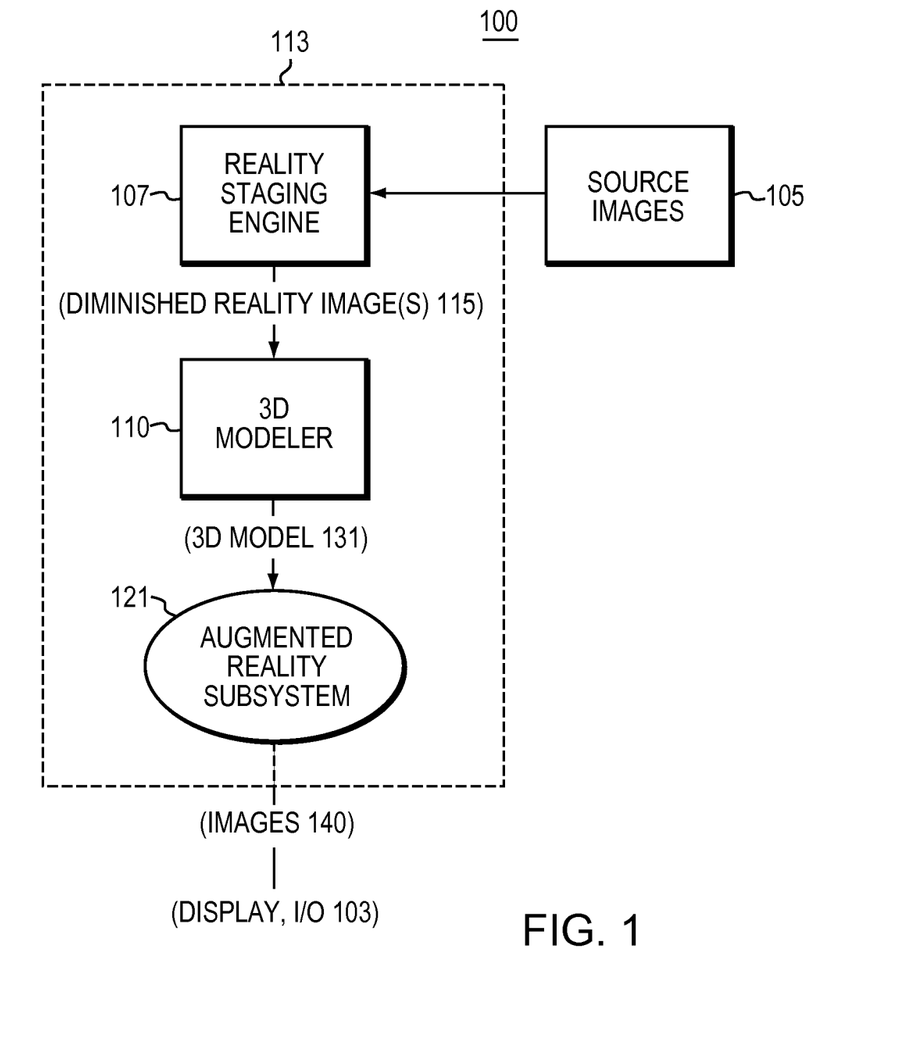
FIG. 1 is a block diagram of an embodiment of the present invention.

A non-limiting example embodiment is shown in FIG. 1 as a computer-based tool 100. It is understood that other computer-based methods, systems and computer program products may provide other embodiments and implementations of the present invention. Tool 100 is formed of processor-executed reality staging engine 107 and a 3D modeler 110. Processor 113 executes or otherwise supports tool 100, reality staging engine 107 and 3D modeler 110. As will be made clear below, reality staging engine 107 declutters, tidies or otherwise diminishes reality in subject images (of an environment of interest) from a source 105. The image source 105 may be a camera, 2D or 3D scanner, one or more data stores (database of images), a video stream and so on.

For each of a plurality of objects in the subject environment as displayed in source image 105, display of the object in a diminished reality view is user-selectable. In this way, degree of diminished reality (diminishing of reality) in images 115 generated by staging engine 107 is user definable.

The 3D modeler 110 receives as input the diminished reality images 115 from staging engine 107. 3D modeler 110 generates a 3D model 131 of the subject or contents of the received diminished reality images 115. That is, 3D modeler 110 generates a 3D model 131 of the environment of interest at a user-selected diminished stage, e.g., bare or intermediate stage. 3D modeling from images technology is employed.

An augmented reality subsystem 121 superimposes or otherwise overlaps various virtual image elements on the 3D model 131 from modeler 110. For example, images of various candidate elements (virtual) can be displayed at output 103 on decluttered or tidied scenes (diminished reality) of the subject environment of interest. A graphical user interface of subsystem 121 enables the user to interact with such augmented reality image 140 output using known techniques.

Further details of reality staging engine 107 and tool 100 are presented next.

Figure 2A:
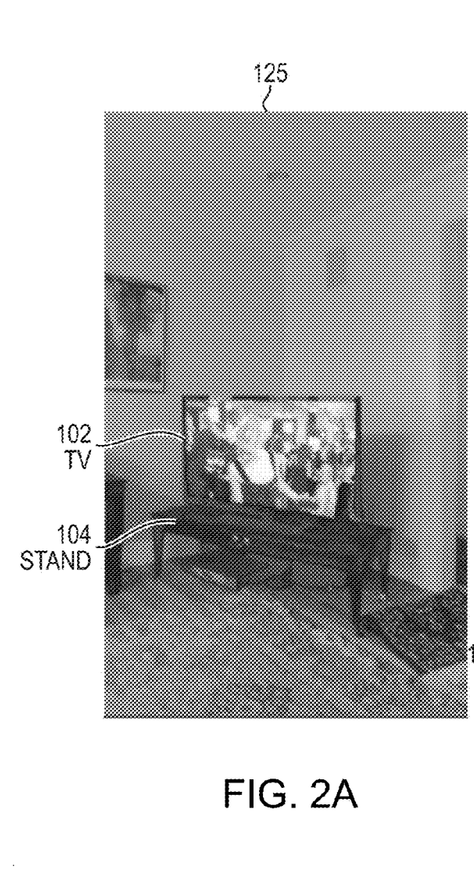
FIG. 2A-2C are photographs marked up to illustrate user-interaction operation in one embodiment.

An example of images 125, 127 (FIGS. 2A-2C and 3A-3B) of rooms of a home is used for purposes of illustration and not limitation. Tool 100 uses one or several photos (images) of a subject furnished room with associated orientation data to create a 3D computer model representation of the room wholly or partially emptied. For example, reality staging engine 107 recreates views 115 of the initial space of the room as though prior to the installation of current furniture, equipment or accessories that the user would like to replace. Specifically, reality staging engine 107 obtains as input from image source 105 one or several images 125, 127 (real-time or photo) of the current room. Tool 100 displays the source image to the user for user interaction therewith such as in FIGS. 2A and 3A. The user identifies on the images 125, 127 the visible line segments that represent the angular borders between the logical geometric portions or regions of the room (i.e. a wall to an adjacent horizontal wall, walls to the ceiling, and walls to the floor). The user identifies these line segments at least in the image areas where the user wants to put the new virtual elements representing real-world objects (e.g., new or candidate furniture, accessories, etc.). Some of the borders are hidden depending on the view in the source image 125, 127 as displayed, so the user only indicates segments of a given line.

Figure 2B:
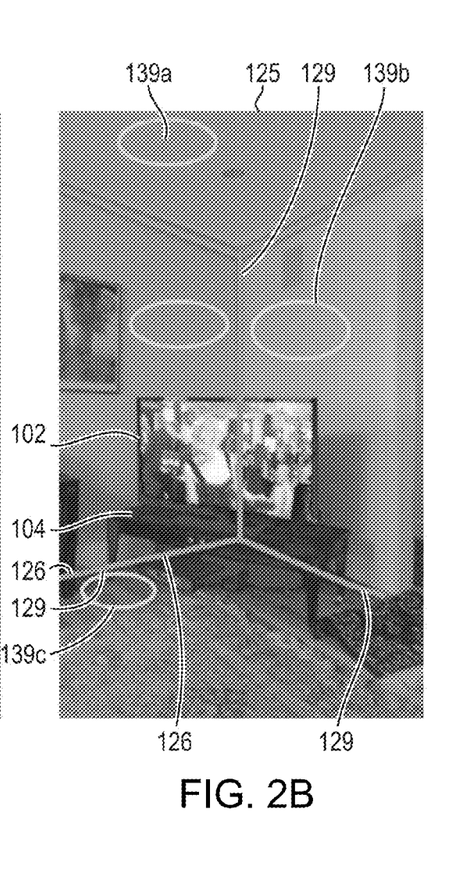
Figure 2C:
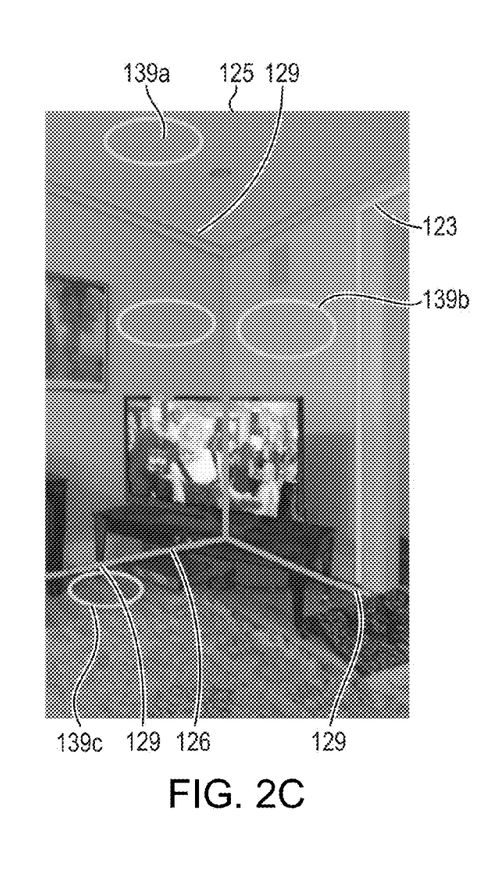
Figure 3A:
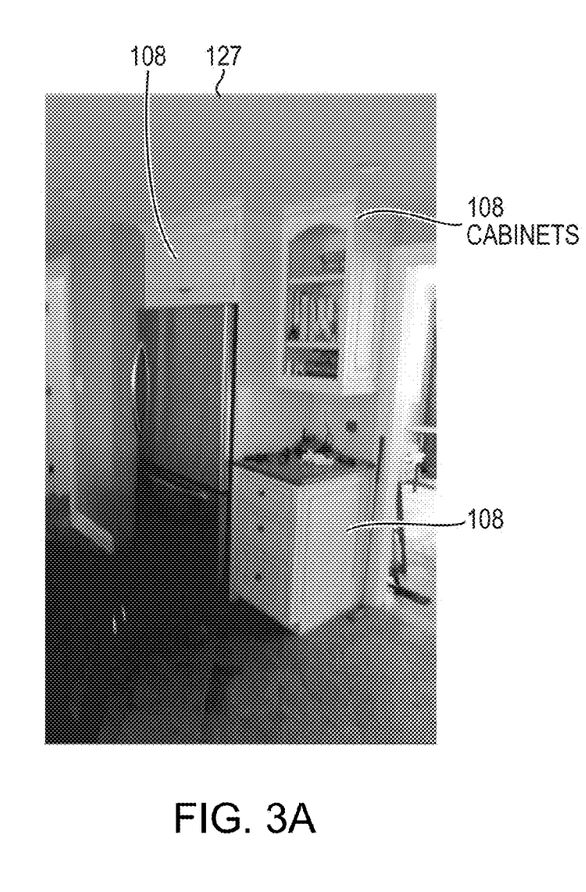
FIGS. 3A-3B are photographs marked up to illustrate user interaction in an embodiment.

In the example of FIG. 2B, the user indicates the green line segment 129 defining the meeting of two walls from the ceiling to just above the top edge of the displayed television 102. The orange line segments 126 defining the corner area behind the television 102 and stand 104 are hidden or obstructed in this view (image 125). The user does not draw these orange line segments 126. In FIG. 2C the user has indicated the dark yellow line segment 123 outlining a doorway opening of the room. Likewise in the example of FIG. 3B, the user only indicates the green line segments 133 of the visible wall-to-ceiling juncture between cabinets 108 and indicates the dark yellow line segments 135 defining where two walls meet that is visible in the displayed view (image 127). The user does not draw the orange line segments 136 over the displayed refrigerator and cabinets 108 (as will be made clear below).

Next reality staging engine 107 enables the user to interactively identify textures 139a, b, c that are to be applied to the ceiling, walls and floor, respectively. This is carried out in one embodiment by the user encircling on the displayed image 125, 127 a region of each of the wall, ceiling, and floor which is representative of the initial state of that room element (wall, ceiling and floor).

Figure 3B:
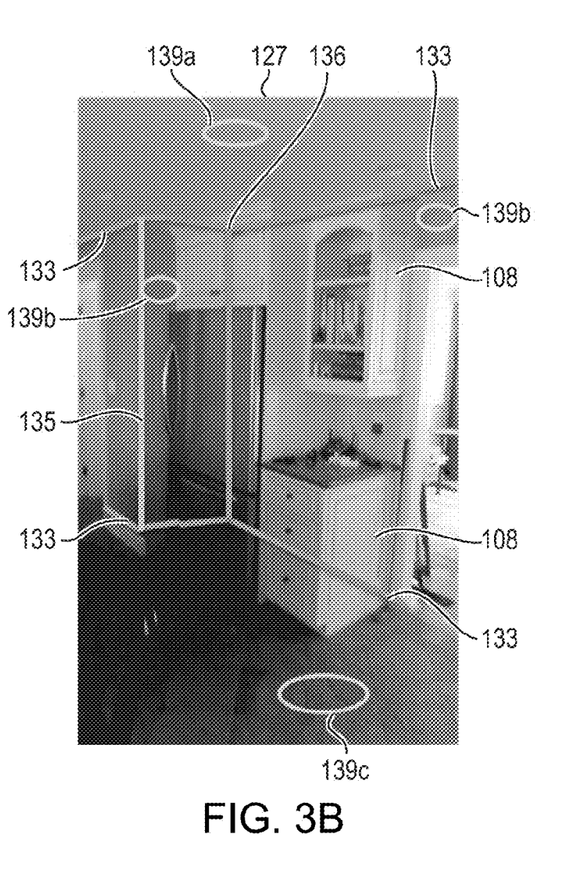

In the examples of FIGS. 2B and 3B, the user circles paint colors and textures 139a, b of the ceilings and walls at unencumbered locations in the displayed images 125, 127. Similarly, the user circles unencumbered representative areas 139c of the displayed floors to indicate respective floor colors and textures 139c.

With the foregoing user selections (interactive input), the reality staging engine 107 makes the following determinations. Reality staging engine 107 completes the border lines initiated by the user in FIGS. 2B and 3B. In particular, reality staging engine 107 completes the border lines where they intersect, in hidden corners, behind displayed furnishings or other objects as shown completed in FIGS. 2B-2C and 3B. Reality staging engine 107 draws the orange line segments 126 over the displayed television 102 and stand 104 in FIGS. 2B-2C and the orange line segments 136 over the refrigerator and cabinets (upper and lower) 108 in FIG. 3B. From the completed border lines, reality staging engine 107 determines the room (subject environment) in its bare or empty stage for example.

The foregoing is iterated for several source images 105 (images 125, 127 in the room example) of the subject environment. Each iteration of the above is with respect to a different source image 105. Different source images 105 show different portions and different angles of view of the subject environment (e.g., room) and real-world objects therein. The foregoing procedure allows the user, on an object by object basis, to selectably maintain or remove display of each object in the subject environment as displayed in source images 105. As such, degree of diminished reality (in the range from bare/empty to intermediate stages) of the subject environment in working views is user-definable in tool 100.

Next reality staging engine 107 determines where are the naked regions (i.e., a wall, a ceiling, a molding, a floor, a plinth) in the source images 125, 127. Reality staging engine 107 determines from these regions a paint color and texture as circle-indicated by the user.

The results of the foregoing determinations produce diminished reality images 115 of the room (subject environment) in a bare or empty stage or other user-selected intermediate stage. In the room example of FIGS. 2 and 3, the diminished reality images 115 mostly display the floor, ceiling, walls, doorway(s) and window(s), i.e., the major surfaces and planes that define the containing borders of the subject environment (room). Reality staging engine 107 feeds the resulting diminished reality images 115 to 3D modeler 110 to generate a working 3D model 131 (FIG. 1) of the bare stage subject environment (i.e., emptied or nearly empty living room in the example of FIGS. 2A-2C and emptied or nearly empty kitchen in the example of FIGS. 3A-3B). Each region of the working 3D model 131 is painted in its totality using the color and texture corresponding to user-encircled areas of source images 125, 127. Gradients can be used for the coloring and texturing of the 3D model 131. The paint covers each region of the 3D working model 131 with the proper texture on all the visible frames of the room, as shown in FIGS. 2A-2C as well as FIGS. 3A and 3B.

Given multiple images 115 from different orientations and locations, 3D modeler 110 creates a 3D computer model or 3D image representation of the room (subject environment captured in source images 105) but at a bare stage or at least at a different stage than that displayed in source images 125, 127. 3D modeler 110 utilizes 2D image-to-model technology. The resulting working 3D model 131 is independent of the orientation of the camera of source 105.

As a result, a complete 3D model/image representation 131 of the empty room (or partially emptied room) can be created. In the example of the living room and kitchen of FIGS. 2A-2C and 3A-3B, a 3D model representation 131 of these rooms minus the furniture, amenities and cabinetry are created.

3D modeler 110 outputs the generated 3D model 131, for instance as input to augmented reality subsystem 121. In turn, the 3D model 131 images can be used interactively with augmented reality. For example, the 3D model 131 images in augmented reality can be used to verify the design of a new kitchen or the remodeling or interior decorating/ furnishing of a living room in the examples of FIGS. 2A-3C. In other examples, retail store floor and shelves can be used to verify a promotion plan and product stocking design. Augmented reality subsystem 121 enables the user to overlay or superimpose image elements on the 3D model 131 images of the bare stage subject environment/empty room. The image elements may be images or likeness of target or candidate real-world objects such as furniture, furnishings, amenities, accessories, cabinetry and the like for the subject rooms.

The candidate objects may be in substitution of or replacement of counterpart objects displayed in the source images 105. The candidate objects may be a rearrangement or different organization (configuration) of the counterpart objects displayed in source images 105. The candidate objects may have no counterpart or equivalent in the source image 105 so that the user can in virtual views 140 pictorially introduce new objects to the subject environment/ room. Any mixture of these scenarios is supported by augmented reality subsystem 121.

In other embodiments, the scenario swapping virtual views 140 described above may be in addition to or combination with various known coloring and surface texturing tools. Such a combination enables the user to not only virtually explore structure-based object configurations (object shapes, sizes, geometries) but to also consider esthetic and interior design-based configurations (object colors, textures, groupings and patterns).

In these and other uses/applications, the tool 100 allows some user-definable amount of reality of the source image (of a subject environment) to be maintained while freeing the user from obstructing/impeding appearances of other amounts of reality (i.e., the real world objects in the subject environment as displayed in the source image 105).

The augmented reality subsystem 121 enables end users to recognize the output image 140 view with an augmented reality display device 103 (FIG. 1). In embodiments, the augmented reality view 140 may be displayed in a markerless form but may allow user-interactive manual designation or use of markers. Other embodiments enable further automated user interaction.

From the 3D model 131, the augmented reality subsystem 121 determines and defines working or logically operative lines of the subject environment view in output images 140. The procedure to accomplish this in one embodiment is as follows.

Start with ceiling and moldings,
Continue with the floor around doors (use plinths),
Look at vertical line segments between walls,
Look at windows and frames around them, and
Look at doors and frames around them.

Next the augmented reality subsystem 121 generates output images 140 and corresponding lines. First, an edge detection algorithm is applied to the output image 140. The result is a number of lines which need further analysis.

Next, barrel and pincushion distortions due to the optics are eliminated in order to create a rectilinear image 140. The result is a clean image with straight lines for the main edges. This step may be avoided depending on the quality of the optics used by the camera for source image 105.

Images such as those 140 output by augmented reality subsystem 121 have five different parameters: pan, tilt, zoom, roll and focus plane. In some embodiments known algorithms are employed for the focus plane. In other embodiments, focus plane parameters are ignored.

Image 140 parameters for pan can be captured by the orientation of the subsystem 121 camera which is tracked by a compass sensor.

The image 140 zoom parameter can be captured by using a reference on the unmasked portion of a wall or planar surface in the subject environment. For example a standard piece of paper folded in two along the diagonal (e.g., a 8.5"×11" or A4 sheet of paper). The folded paper can be taped against the unmasked portion of the wall/reference surface with transparent adhesive tape. This will be recognized by the augmented reality subsystem 121 and provide the zoom and the distance to the paper.

The roll parameter of output images 140 can be measured by the subsystem 121 looking at the almost vertical edges of the image 140 and rectifying the roll in order to make the edge true verticals.

Tilt depends on the height of the subsystem 121 camera at the capture of the image 140, which is related to the height of the person taking the image. The tilt on the output images 140 should cover the ceiling and the floor on the same image frame or on plural different images (frames).

Figure 4A:
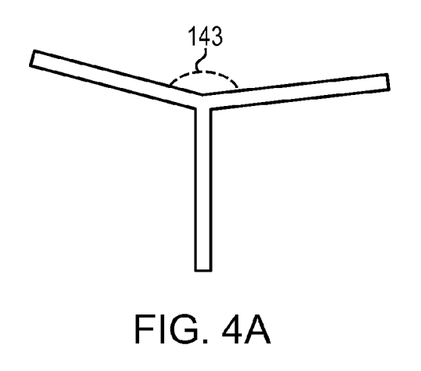
FIGS. 4A-4D are schematic illustrations of angles in images considered in processing in embodiments.
Figure 4B:
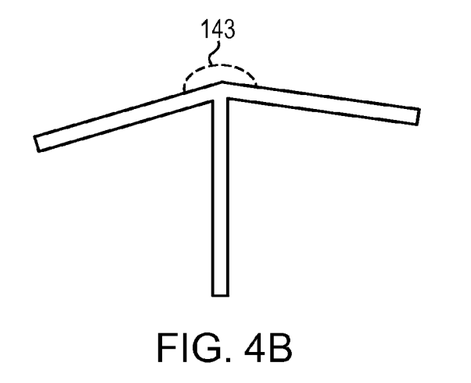

In the case of the output image 140 displaying the corners of the ceiling, augmented reality subsystem 121 generates and adjusts the image depending on the apparent angle between the two lines created by the intersection of each wall with the ceiling. If the upper angle 143 is less than 180 degrees, as depicted in FIG. 4A, the distance from the intersection point of the trihedron in the output image 140 to the subsystem 121 camera is larger than the distance between the trihedron in the subject environment and the source image 105 camera. If the upper angle 143 is more than 180 degrees, as depicted in FIG. 4B, the distance from the intersection point of the trihedron in the output image 140 to the augmented reality subsystem 121 camera is shorter than the distance between the trihedron in the subject environment and the source image 105 camera. Thus the augmented reality subsystem 121 camera is in front of the counterpart position of the source image camera when the source image 105 was taken.

Figure 4C:
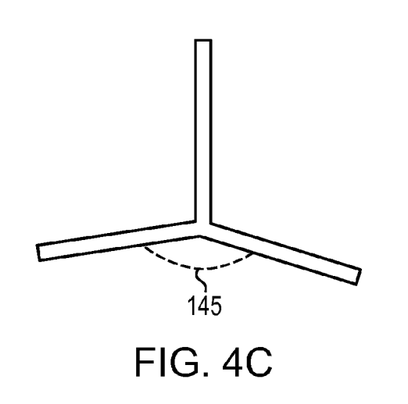

Similarly, in the case of output images 140 including the corners of the floor. Augmented reality subsystem 121 adjusts image 140 depending on the apparent angle between the two lines created by the intersection of each wall with the floor. If the lower angle 145 of the trihedron is less than 180 degrees, as depicted in FIG. 4C, then the distance between the intersection point in output image 140 and the camera in augmented reality subsystem 121 is larger than the counterpart distance of the source image camera when the source image 105 was taken.

Figure 4D:
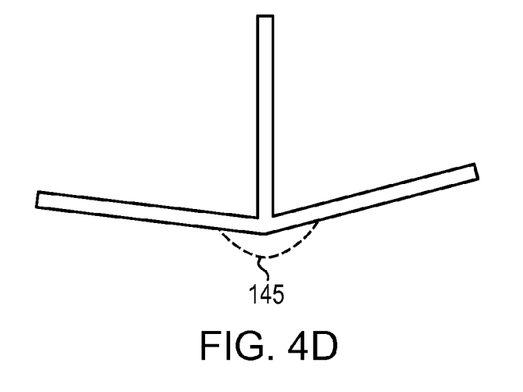

If the lower angle 145 of the trihedron is more than 180 degrees, as depicted in FIG. 4D, then distance between the intersection point in output image 140 and the camera in the augmented reality subsystem 121 is closer (shorter) than the counterpart distance of the source image camera when the source image 105 was taken.

For all these corners, the initial assumption is that there is an angle of 90 degrees between the two adjacent planes of the walls. A correction is applied if the total sum of the angles of the walls around the room do not equal to 360 degrees.

The solution can be semi-automated by steps or be fully automated, in real time with the appropriate computational resources.

Figure 5:
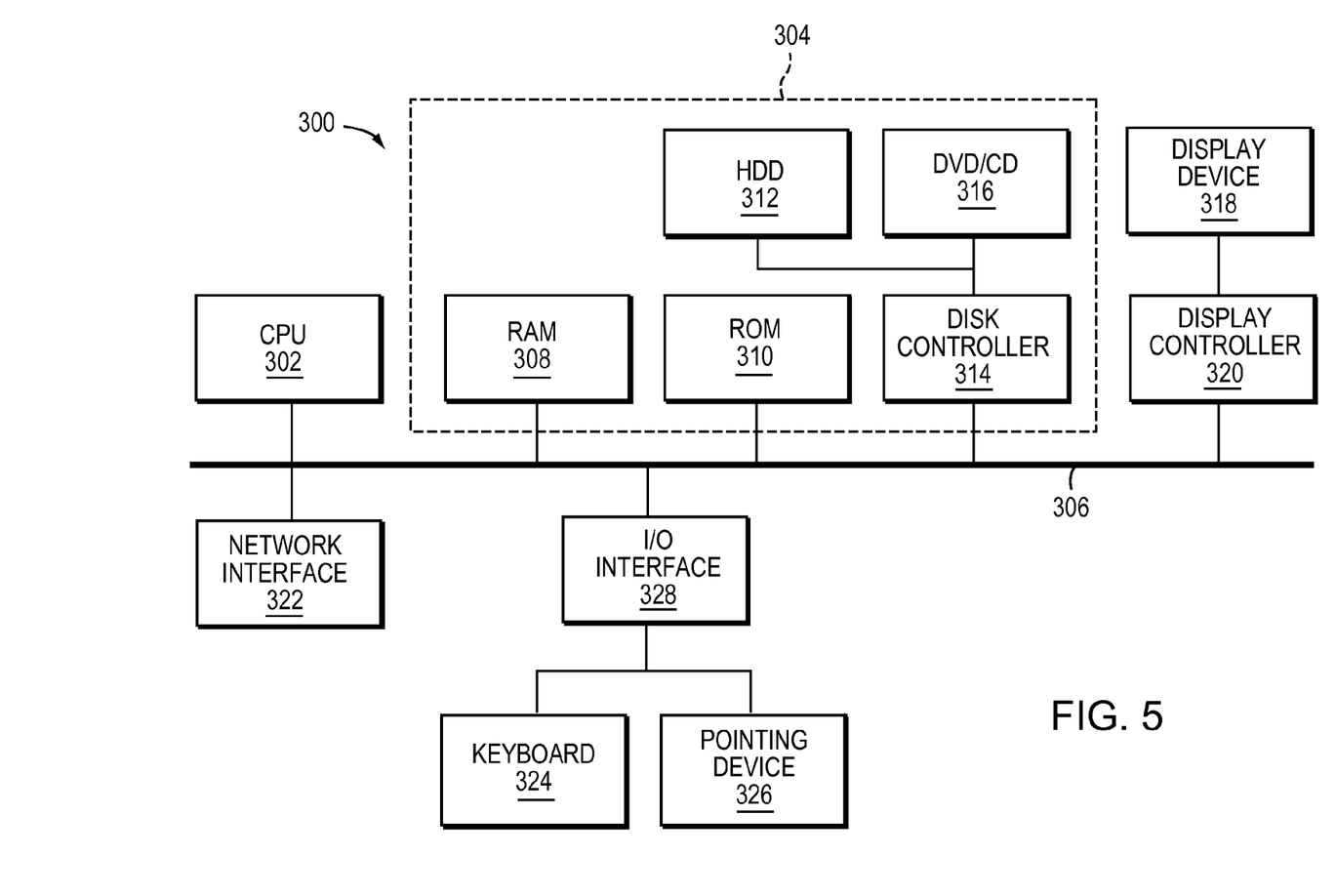
FIG. 5 is a block diagram of a computer system embodying the present invention.

FIG. 5 is a schematic block diagram of an exemplary computer-aided design station 300, which may also be referred to herein as a computer system. As used herein, the terms "computer-aided design station" and "computer system" refer generally to any suitable computing device that may be used to perform the processes described above and/or any additional processes that may be related to those described above.

In an exemplary embodiment, the computer-aided design station 300 includes one or more processors 302 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a non-transitory computer-readable medium, such as a memory area 304 that is operably and/or communicatively coupled to the processor 302 by a system bus 306. A "memory area," as used herein, refers generally to any means of storing program code and instructions executable by one or more processors to aid in generating diminished reality views (images) of an environment of interest using a diminishing reality tool 100. The memory area 304 may include one, or more than one, forms of memory. For example, the memory area 304 may include random-access memory (RAM) 308, which can include non-volatile RAM, magnetic RAM, ferroelectric RAM, and/or other forms of RAM. The memory area 304 may also include read-only memory (ROM) 310 and/or flash memory and/or electrically-erasable programmable read-only memory (EEPROM). Any other suitable magnetic, optical, and/or semiconductor memory, such as a hard-disk drive (HDD) 312, by itself or in combination with other forms of memory, may be included in the memory area 304. HDD 312 may also be coupled to a disk controller 314 for use in transmitting and receiving messages to and from processor 302. Moreover, the memory area 304 may also be, or may include, a detachable or removable memory 316, such as a suitable cartridge disk, CD-ROM, DVD, or USB memory. The above examples are exemplary only and, thus, are not intended to limit in any way the definition and/or meaning of the term "memory area."

The computer-aided design station 300 also includes a display device 318 that is coupled, such as operably coupled, to a display controller 320. The display controller 320 receives data via the system bus 306 for display by the display device 318. The display device 318 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller. The above examples are exemplary only and, thus, are not intended to limit in any way the definition and/or meaning of the term "display device."

In addition, the computer-aided design station 300 includes a network interface 322 for use in communicating with a network (not shown in FIG. 5). Moreover, the computer-aided design station 300 includes one or more input devices, such as a keyboard 324 and/or a pointing device 326, such as a roller ball, mouse, touchpad, and the like. The input devices are coupled to and controlled by an input/output (I/O) interface 328, which is further coupled to the system bus 306.

A description of the general features and functionality of the display device 318, keyboard 324, pointing device 326, as well as the display controller 320, disk controller 314, network interface 322, and I/O interface 328 is omitted herein for brevity as these features are known.

Figure 6:
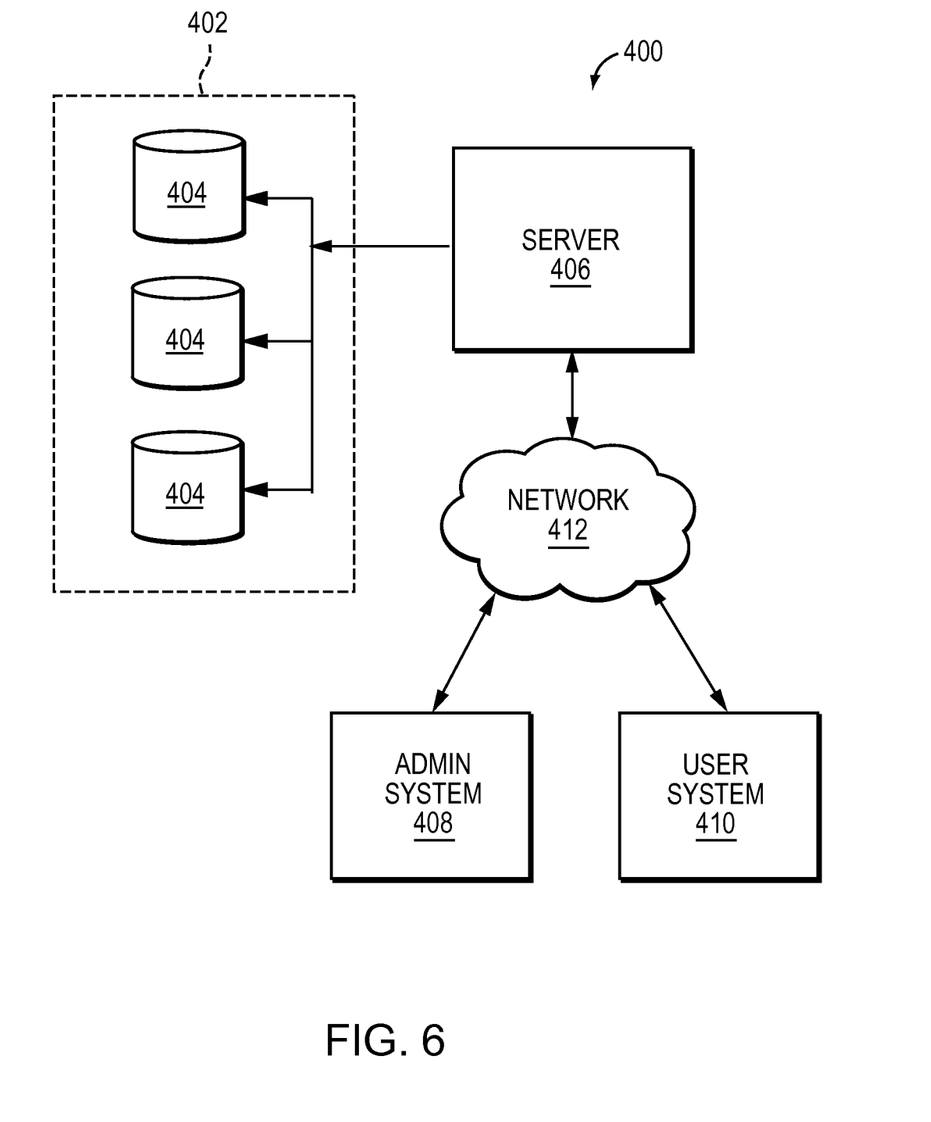
FIG. 6 is a schematic view of a computer network employing the computer system of FIG. 5.

FIG. 6 is a schematic block diagram of an exemplary system 400 for use in computer-aided design of a decluttered/tidied or diminished reality view of an environment of interest and augmented reality user thereof, such as the processes described above and/or additional processes that may be related to those described above. In an exemplary embodiment, a memory area 402 includes one or more storage devices 404 for use in storing source image data, CAD data, such as modeled diminished reality data, and augmented reality data, and/or positioning data related to augmented reality objects. In some embodiments, the memory area 402 is coupled to a server 406, which is in turn coupled to an administrator system 408 and/or a user system 410 via a network 412. The storage devices 404 may be embodied as one or more databases, may be located at a single or at multiple geographical sites, or may be integrated with the server 406.

As can be appreciated, the network 412 can be a public network, such as the Internet, or a private network such as an LAN or WAN network, or any combination thereof and can also include PSTN or ISDN sub-networks. The network 412 can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network 412 is merely exemplary and in no way limits the scope of the present advancements.

As one of ordinary skill in the art would recognize, the administrator system 408 and/or the user system 410 can be a computer-aided design station such as the one described above with reference to FIG. 5, or any other computing system that is known. Moreover, it should be understood that the administrator system 408 and/or the user system 410 are configured to perform the processes described above and/or any additional processes that may be related to those described above.

The server 406 stores the computer-readable instructions to execute the processes described above and provides these instructions via the network 412 to the administrator system 408 and/or the user system 410. Moreover, the server 406 can also provide data from the memory area 402 as needed to the administrator system 408 and the user system 410. As such, FIG. 6 includes implementations of the system 400 via cloud computing, distributed computing and the like.

Exemplary embodiments of systems, methods, apparatus, computer program products, and computer-readable storage media for use in computer-aided design of a diminished reality environment and interactive images thereof are described above in detail. The systems, methods, apparatus, computer program products, and computer-readable storage media are not limited to the specific embodiments described herein but, rather, operations of the methods, program products and/or storage media, as well as components of the system and/or apparatus, may be utilized independently and separately from other operations and/or components described herein. Further, the described operations and/or components may also be defined in, or used in combination with, other systems, methods, apparatus, program products and/or storage media, and are not limited to practice with only the systems, methods, apparatus, program products and storage media as described herein.

A computer or computer system, such as those described herein, includes at least one processor or processing unit and a system memory. The computer or computer system typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary non-transitory computer-executable components for use in the processes described above include, but are not limited to only including, a display component that causes the processor 302 (shown in FIG. 5) to present a modeled diminished reality environment 131 superimposed with augmented reality image elements representing user-selectable real-world objects on a display device 318 (shown in FIG. 5). The components also include an interface component that causes the processor 302 to receive user inputs via, for example, the I/O interface 328 (shown in FIG. 5). As described above, the user inputs may be related to indicate physical details of subject environment to declutter/diminish of objects, creating a CAD model view, overlaying augmented reality view onto the CAD model view of diminished reality, creating an instance of tool 100, and/or to position (align) user-interactive augmented reality view 140.

Moreover, the components include a reality staging component and a 3D modeling component that cause the processor 302 to perform the steps described above. The reality staging component together with the 3D modeling component generate a CAD model view of the subject environment diminished in reality, decluttered of user-selected originally displayed objects, overlayed with virtual elements in the augmented reality view 140. The augmented reality component enables user interaction therewith to update virtual elements representing real world objects that are changed (e.g., rearranged, reorganized), updated (in color, texture, etc.) and/or substituted by the user.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well-known computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While this invention has been particularly shown and described with references to example embodiments thereof, it will be understood by those skilled in the art that various changes in form and details may be made therein without departing from the scope of the invention encompassed by the appended claims.

What is claimed is:

1. A computer method of displaying a subject environment comprising:
    digitally generating a set of one or more images that form a first view depicting a subject environment in an origination state instead of in a current state, such that the first view is a three-dimensional (3D) diminished reality of the subject environment by:
        receiving a two-dimensional (2D) source image displaying the subject environment in the current state,
        determining line segments defining the borders of the subject environment based on line segments in the 2D source image and line segments extrapolated from the 2D source image, the determined line segments being a background of the subject environment, and
        digitally forming a 3D model of the 3D diminished reality of the subject environment, the 3D model being based on the background of the subject environment and having objects of the 2D source image that are separate from the background removed from the 3D model; and
    enabling computer-based user interaction with the set of images forming the first view in a manner that generates a second view, the second view being a 3D augmented reality representation of the subject environment in its origination state having augmentations based on the enabled computer-based user interaction instead of the current state.

2. The computer method as claimed in claim 1 wherein the first view depicts a lesser amount of real-world objects in the subject environment than amount of real-world objects displayed in the 2D source image.

3. The computer method as claimed in claim 1 wherein the first view depicts the subject environment being bare of objects.

4. The computer method as claimed in claim 1 wherein enabling computer-based user interaction includes providing a user interface to an augmented reality subsystem.

5. The computer method as claimed in claim 1 wherein the generated second view superimposes one or more virtual elements on the first view, each virtual element representing a respective real-world object.

6. The computer method as claimed in claim 1 wherein the subject environment is a room; and
    the first view depicts the room being substantially empty contrary to the current state of the room.

7. The computer method as claimed in claim 6 wherein the second view displays an augmented reality representation of the room with one of:
    one or more objects in the room that are absent from the current state of the room, and
    one or more objects in the room that are different from the current state of the room.

8. The computer method as claimed in claim 7 wherein the one or more objects are any of: furniture, furnishings, amenities and accessories.

9. The computer method as claimed in claim 1 wherein for each of a plurality of objects in the subject environment, display of the object in the first view is user-selectable.

10. The computer method as claimed in claim 1 further comprising: creating a 3D model of the subject environment in diminished reality using the set of images forming the first view, wherein the 3D model is employed in the augmented reality representation of the subject environment.

11. A computer apparatus for displaying a subject environment, comprising:
    a reality staging engine executable by a processor and configured to generate a set of one or more images that form a first view depicting a subject environment in an origination stage other than a current stage by:
        receiving a two-dimensional (2D) source image displaying the subject environment in the current state, and
        determining line segments defining the borders of the subject environment based on line segments in the 2D source image and line segments extrapolated from the 2D source image, the determined line segments being a background of the subject environment;

a 3D modeler coupled to receive the generated set of images from the reality staging engine, and the 3D modeler configured to form a 3D model of the subject environment in diminished reality by digitally forming a 3D model of the 3D diminished reality of the subject environment, the 3D model being based on the background of the subject environment and having objects of the 2D source image that are separate from the background removed from the 3D model; and an augmented reality interface enabling user interaction with an augmented reality representation of the subject environment formed from the 3D model in its origination state having augmentations based on the enabled computer-based user interaction instead of the current state.

12. The computer apparatus as claimed in claim 11, wherein the first view depicts a lesser amount of real-world objects in the subject environment than amount of real-world objects displayed in the 2D source image, such that amount of real-world objects in the 3D model of the subject environment is lesser than amount of real-world objects displayed in the 2D source image.

13. The computer apparatus as claimed in claim 11 wherein the augmented reality interface superimposes one or more virtual elements on views of the 3D model, each virtual element representing a respective real-world object.

14. The computer apparatus as claimed in claim 11 wherein the subject environment is a room, and the first view depicts the room being substantially empty.

15. The computer apparatus as claimed in claim 14 wherein the augmented reality representation of the room is displayed with one of:
one or more objects in the room that are absent from the current stage of the room, and
one or more objects in the room that are different from the current stage of the room.

16. The computer apparatus as claimed in claim 15 wherein the objects include any of: furniture, furnishings, amenities and accessories.

17. A computer program product for displaying a subject environment, comprising:
a non-transitory computer readable medium; and
computer code embodied on the computer readable medium and executable by a processor to display a subject environment by:
digitally generating a set of one or more images that form a first view depicting the subject environment in a user-selectable stage different from a current stage of the subject environment, such that the first view is a diminished reality of the subject environment by:
receiving a two-dimensional (2D) source image displaying the subject environment in the current state,
determining line segments defining the borders of the subject environment based on line segments in the 2D source image and line segments extrapolated from the 2D source image, the determined line segments being a background of the subject environment, and
digitally forming a 3D model of the 3D diminished reality of the subject environment, the 3D model being based on the background of the subject environment and having objects of the 2D source image that are separate from the background removed from the 3D model; and
providing an augmented reality interface applied to the set of images forming the first view in a manner that generates a second view, the second view being an augmented reality representation of the subject environment in its user-selectable stage having augmentations based on the enabled computer-based user interaction instead of the current stage.

* * * * *